G. M. RICKETTS.
BICYCLE OR SIMILAR WHEEL.
APPLICATION FILED AUG. 10, 1920.
1,382,122.
Patented June 21, 1921.
2 SHEETS—SHEET 2.
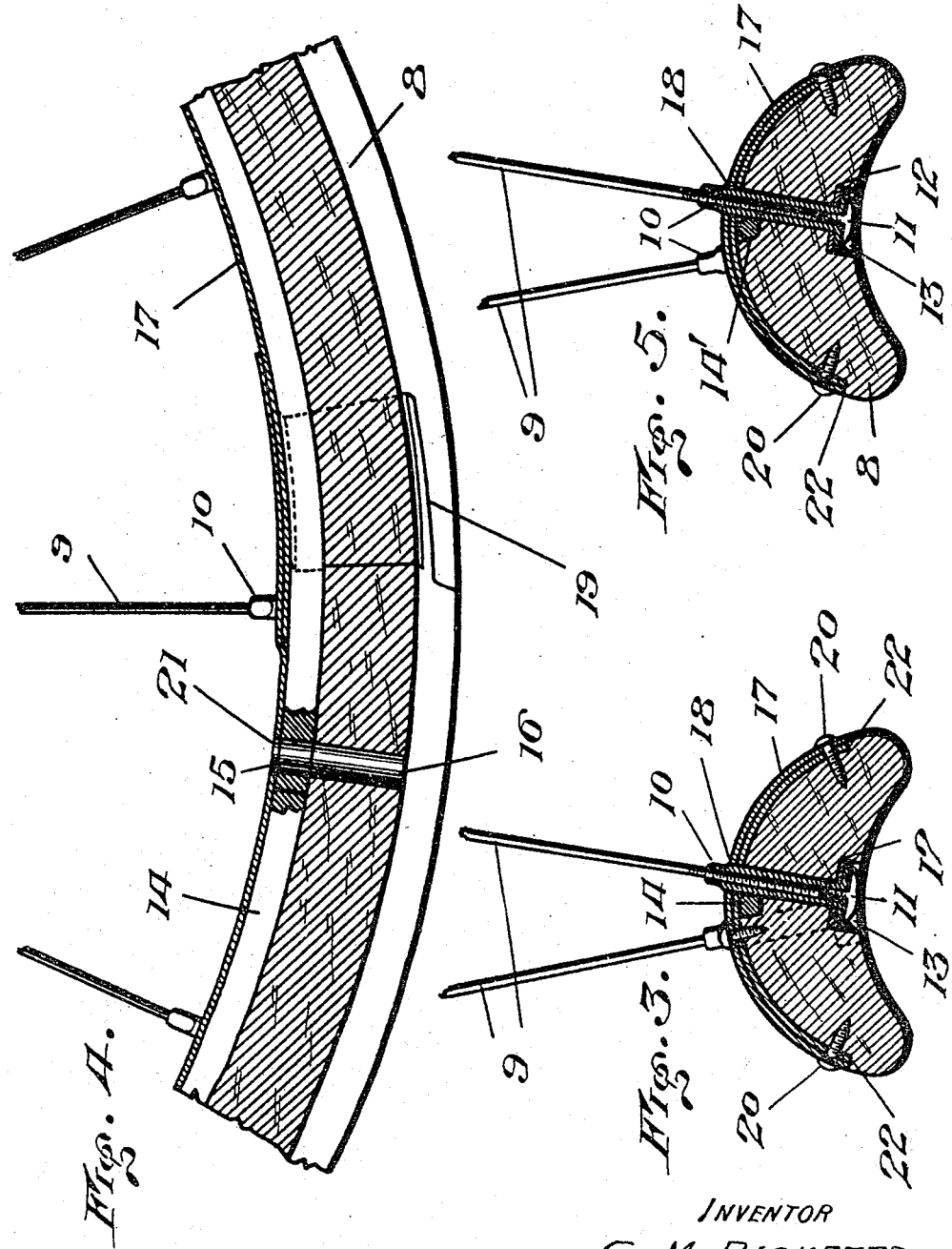
INVENTOR
G. M. RICKETTS
by Monroe E Miller
ATTORNEY

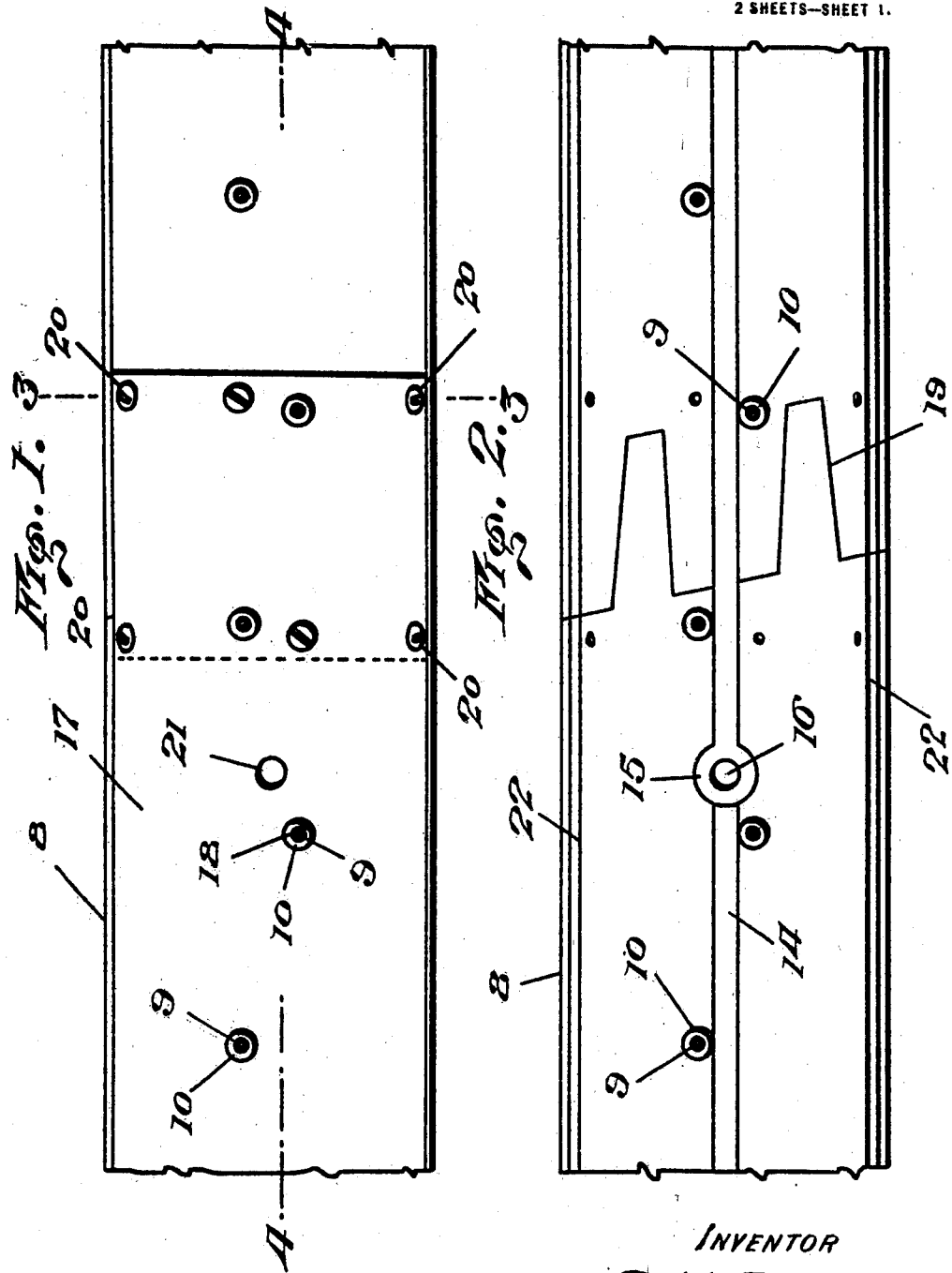

UNITED STATES PATENT OFFICE.

GILBERT M. RICKETTS, OF COLUMBUS, OHIO.

BICYCLE OR SIMILAR WHEEL.

1,382,122.	Specification of Letters Patent.	Patented June 21, 1921.

Application filed August 10, 1920. Serial No. 402,620.

*To all whom it may concern:*

Be it known that I, GILBERT M. RICKETTS, a citizen of the United States, residing at Columbus, in the county of Franklin and State of Ohio, have invented certain new and useful Improvements in Bicycle or Similar Wheels, of which the following is a specification, reference being had therein to the accompanying drawing.

The present invention relates to wire wheels, such as used on bicycles and the like, and comprising a wooden felly in which the outer terminals of the spokes are anchored by means of usual adjusting nipples.

The wooden fellies of such wheels have a tendency to warp or become distorted laterally, especially when one or more spokes are broken or loosened, and although wooden fellies have this objection, it has been found that they are preferable for bicycle and similar wheels as compared with metal fellies or rims, to which the tires can not be securely cemented, as is the case with wooden fellies.

In order to reinforce and strengthen the wooden felly, to prevent warping and distortion thereof, even though one or more spokes are broken or loosened, it is the object of the invention to provide novel and improved means for accomplishing such results in a simple and comparatively inexpensive manner, by the provision of a bar or rod embedded in the felly.

A further object is to arrange such bar or rod with respect to the spoke nipples in order to obtain added strength of the wheel.

A further object is the provision of a weather strip for the inner periphery of the wooden felly to protect same from the elements, and to materially assist in strengthening the felly, especially at the joint, whereby the wheel will give longer service.

With the foregoing and other objects in view, which will be apparent as the description proceeds, the invention resides in the arrangement and construction of parts hereinafter described and claimed, it being understood that changes can be made within the scope of what is claimed without departing from the spirit of the invention.

The invention is illustrated in the accompanying drawings, wherein:—

Figure 1 is a view of a fragmentary portion of the wheel felly, containing the improvements, showing the same laid flat, Fig. 2 is a similar view, showing the weather strip removed.

Fig. 3 is a cross section on the line 3—3 of Fig. 1.

Fig. 4 is a longitudinal section taken on the line 4—4 of Fig. 1.

Fig. 5 is a view similar to Fig. 3, showing a modification.

The conventional wooden felly is indicated at 8, being of crescent-shaped cross section, with its outer periphery concaved to receive the tire, and the inner periphery convexed transversely. The wire spokes 9 have their outer terminals screw threaded, as usual, within nipples 10 extending through the felly and mounted for rotation therein, the outer ends of said nipples having the usual heads 11 seated against washers 12 which are in turn seated within recesses 13 in the outer periphery of the felly, and enabling the spokes to be tightened or loosened by rotating said nipples.

In carrying out the invention, a bar 14, shown as of square cross section, is embedded in the inner periphery of the felly in a groove provided therein to receive such bar, flush with the inner peripheral surface of the felly, and this bar is of stiff metal, whereby to resist distortion of the felly. The bar 14 has a ring 15 at one end embedded in the rim and registering with the opening 16 for receiving the valve stem of the tire, and the opposite end of the bar abuts against the ring 15, as seen in Fig. 3. The arrangement is such, that the staggered spoke nipples 10 contact with the opposite sides of the bar 14, whereby to materially strengthen the felly against laterally warping or distortion, inasmuch as the nipples in contacting with the opposite sides of the metal bar, will resist such distortion of the felly.

In order to protect the inner periphery of the felly from rain and other elements, a transversely curved weather strip 17, preferably of sheet metal, extends along the inner periphery of the felly and closely fits the inner peripheral surface, said strip being provided with apertures 18 through which nipples 10 extend. This strip will also assist in strengthening the felly and its end portions overlap across the scarf joint 19 of the felly, and such overlapping end portions are secured to the felly by means of screws 20 or the like, thereby adding strength to the felly at its weakest point. The strip 17 has an aperture 21 registering with the ring 15 and opening 16 for the passage of the tire valve stem, and the felly 8 is preferably formed with abutments 22 along the opposite edges thereof against which the edges of the strip 17 abut flush with the surface of the felly, to provide a neat finish.

Fig. 5 illustrates a modification, in that a rod 14' of circular cross section is embedded in the inner periphery of the felly 8 between the staggered spoke nipples 10, instead of a bar 14 as above described.

Having thus described the invention, what is claimed as new is:—

1. A wheel including a wooden felly, wire spokes anchored therein, and a bar secured to the inner periphery of the felly adjacent to the spokes.

2. A wheel including a wooden felly, wire spokes anchored within the felly, and a reinforcing bar embedded within the inner periphery of the felly between the spokes.

3. A wheel including a wooden felly, wire spokes, nipples threadedly engaging the spokes and fitted in said felly in staggered arrangement, and a reinforcing bar embedded in the inner periphery of the felly with the nipples contacting therewith at opposite sides.

4. A wheel including a wooden felly, spokes anchored to the felly, and a reinforcing bar embedded in the inner periphery of the felly adjacent to the spokes and having a ring at one end for the passage of the tire valve stem, the opposite end of the bar abutting said ring.

5. A wheel including a wooden felly having a joint, wire spokes anchored to said felly, and a strip fitting the inner periphery of the felly and having overlapping end portions secured to the felly across said joint.

6. A wheel including a wooden felly, spokes anchored to the felly, a stiffening and reinforcing bar inserted in the inner periphery of the felly adjacent to the spokes, and a metal strip fitting the inner periphery of the felly and protecting same from the elements.

In testimony whereof I hereunto affix my signature.

GILBERT M. RICKETTS.